even with a very rough setup.  Such results were indeed surprising.

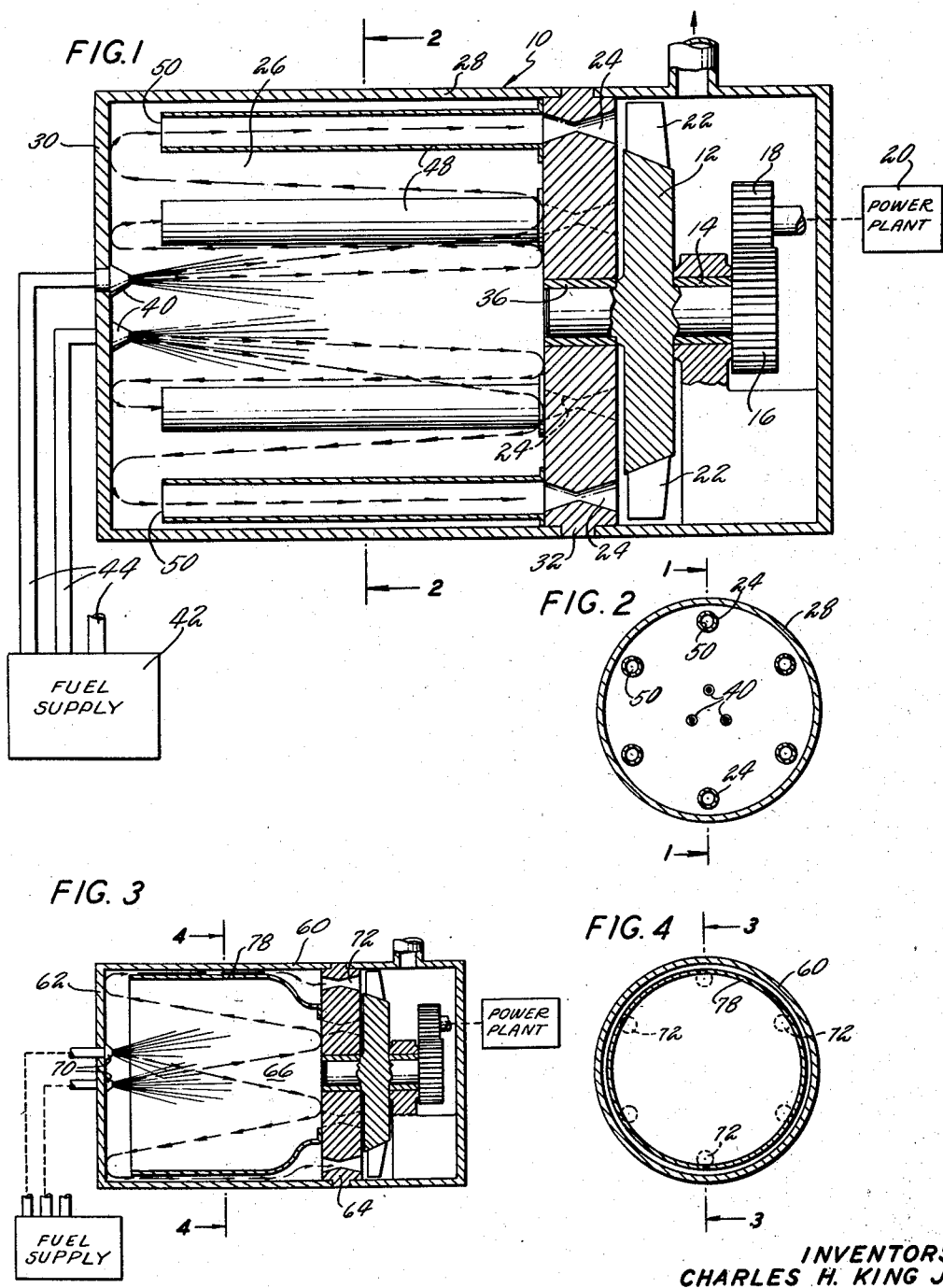

United States Patent Office 2,908,135
Patented Oct. 13, 1959

2,908,135

COMBUSTION CHAMBER FOR MONOFUELS

Charles H. King, Jr., and George D. Lewis, Manchester, Conn., assignors to United Aircraft Corporation, East Hartford, Conn., a corporation of Delaware Application December 7, 1954, Serial No. 473,589

1 Claim. (Cl. 60—39.36)

This invention relates to combustion chambers for turbine type devices or power plants but more particularly to low aspect ratio chambers such as decomposition chambers for monofuels.

It is an object of this invention to provide an improved combustion chamber of low aspect ratio so that weight, size and cost are substantially reduced. Size is particularly important in turbine driven accessories for aircraft where space and weight are at a premium.

This and other objects of this invention will become readily apparent from the following detail description of the drawing in which:

Fig. 1 is a partial cross-sectional view and a partial schematic illustration of a gas driven device having a combustion chamber of this invention.

Fig. 2 is a cross-sectional view taken along the line 2—2 of Fig. 1.

Fig. 3 is a cross-sectional view of a modified version of this invention; and

Fig. 4 is a cross-sectional view taken along the line 4—4 of Fig. 3.

In turbine driven devices, particularly for devices such as aircraft accessories, space and weight are at a premium. Where the gases to drive the turbine are generated within the unit itself the combustion or reaction chamber where the gases are produced must be sufficiently large to permit the reaction to be completed. This is particularly true where monofuels such as propyl nitrate are injected into the combustion or decomposition chamber and the necessary gases subsequently produced.

In order to obtain complete decomposition of the monofuel so as to produce a high volume of hot gases the fuel is generally injected axially toward the decomposition chamber exhaust nozzle and the chamber is made sufficiently long to obtain the desired results. It is also often necessary to control the injection pattern of combustion chamber shape to insure rapid mixing of freshly injected monofuel with decomposed gases. The chamber may be shortened by injecting the monofuel at the exhaust nozzle end of the chamber so that fresh fuel is injected in the path of reversed and oncoming partially or fully decomposed fuel. Thus the fresh fuel is raised in temperature rapidly and the decomposition rate greatly increased. To do this in an aircraft accessory or other type of unit may not always be feasible. This fact will be brought out in connection with the description of Fig. 1.

Referring to Fig. 1, a turbine driven unit 10 is shown as including a turbine rotor 12 suitably mounted to the bearing 14 and driving gears 16 and 18. These gears may be connected to a power plant 20 by suitable clutching mechanism so that the turbine 12 can drive the power plant 20 for starting purposes. The power plant may be of the turbine or piston type. The turbine 12 has a plurality of blades 22 which are driven by gases flowing from a plurality of nozzles 24 which gases are produced within the chamber 26. The chamber 26 comprises an annular casing 28 and two end walls 30 and 32. The exhaust end of the nozzles 24 may terminate in the end wall 32 and adjacent the blades 22 of the turbine.

As mentioned above, in order to shorten the chamber 26 and still provide sufficient volume in a chamber of a satisfactory shape for efficient and complete decomposition of a monofuel, the fuel might be injected from a point centrally of the end wall 32 toward the wall 30. The fuel and the gases produced thereby during decomposition would circulate toward the wall 30 and reverse in the path of the oncoming fresh fuel and eventually high energy gas would then flow out of the nozzles 24. However, in the case where space is limited and as for example as shown herein where the turbine 12 is mounted in the wall 32 by a bearing 36, a problem arises as to obtaining sufficient space through which to conduct the monofuel.

It thus becomes necessary to inject the monofuel at some other location while still obtaining a high decomposition rate within a relatively small volume. It is therefore a feature of this invention to inject a monofuel from a plurality of nozzles 40 located in the wall 30 at the left end of the combustion chamber 26. Fuel is supplied under pressure from a source 42 via conduits 44. In order to insure a high rate of decomposition within a short space the inlets of the nozzles 24 have extension members 48 attached thereto. These members substantially span the space between the end walls 30 and 32 and terminate in a plurality of openings 50 adjacent the end wall 30. The nozzles are circumferentially spaced adjacent to the periphery of the wall 32 as can be clearly seen in Fig. 2. The fuel nozzles 40, however, are located centrally of the wall 30 and hence are radially spaced from the openings 50 of the nozzle extensions 48.

With this construction the monofuel is injected from the nozzles 40 toward the wall 32 so that the fresh fuel comes in contact with partially or fully decomposed fuel which is returning from the wall 32 so that an effective mixing is produced. The gases produced by the decomposition process continue back toward the wall 30 and then out through the openings 50 of the nozzle extensions 48 and then through the nozzles 24 and impinge on the blades 22 of the turbine.

Figs. 3 and 4 show a modified version of this invention. Thus herein is shown a casing 60 having end walls 62 and 64 to form a decomposition or combustion chamber 66. The general arrangement of the fuel nozzles 70 and the exhaust nozzles 72 are identical to that shown in Figs. 1 and 2. However, rather than providing individual tube-like extensions for each of the exhaust nozzles 72 an annular sleeve 78 is provided so that the fresh fuel is injected in the same general direction and the same type of interaction of fresh and partly decomposed fuels and gases impinge upon each other to produce a high rate of decomposition in a very small volume.

Both the tubes 24 (Fig. 1) and the sleeve 78 (Fig. 3) confine a sufficiently small volume such that they do not interfere with the general recirculation pattern which would be established for the type of chamber and fuel injection mentioned above with fuel injection at the exhaust nozzle end of the chamber. It should therefore be noted that the configurations of this invention differ from well known baffling arrays which are intended to lengthen the flow path as for example in heat exchangers or the like.

As a result of this invention a highly compact and lightweight unit may be produced while still performing at the necessary high efficiencies. With such a construction combustion chamber aspect ratios of one or less than one can be provided, the aspect ratio being the length of the combustion chamber divided by its diameter. In fact, aspect ratios of as low as one-fourth have been tested and have proved to be highly efficient, Although this invention is primarily directed to decomposition chambers for monofuels the term combustion chamber or the term reaction chamber as used herein is intended to be synonymous therewith.

Although only two embodiments of this invention have been illustrated and described herein, it will be apparent that various changes and modifications may be made in the construction and arrangement of the various parts without departing from the scope of this novel concept.

What it is desired to obtain by Letters Patent is:

In a monofuel type gas producing device including a decomposition chamber, said chamber including an annular horizontally extending casing having two vertical end walls spaced apart and defining the ends of said chamber, the chamber sides of said walls being flat throughout their entire surface, a plurality of convergent-divergent nozzles having their exhaust ends terminating in one of said walls for directing gases from said chamber, inlets for said nozzles, means providing communication between said chamber and said inlets comprising extension means extending from and carried by said one wall and substantially spanning the space between said walls, said extension means defining a path occupying a relatively small part of the volume of said chamber, said extension means having opening means adjacent the other of said walls, a source of monofuel under pressure, and injecting means carried by said other wall and radially spaced from said opening means for introducing monofuel from said source into the center of said chamber in a path directed substantially perpendicular to and toward said one wall so that the monofuel during decomposition flows toward said one wall, reverses and flows back toward said other wall, then flows into said opening means, back toward said one wall through said extension means, and out through said nozzle exhaust ends, the freshly introduced monofuel particles flowing toward said one wall thereby being impinged upon by partly or fully decomposed particles which are leaving said one wall and flowing toward said other wall to thereby increase the temperature of said fresh particles and increase the total rate of decomposition.

References Cited in the file of this patent

UNITED STATES PATENTS

| | | |
|---|---|---|
| 976,732 | Gherassimoff | Nov. 22, 1910 |
| 1,224,673 | Scott | May 1, 1917 |
| 1,757,855 | Chilowsky | May 6, 1930 |
| 1,969,501 | Chapman | Aug. 7, 1934 |
| 2,358,301 | Brauns | Sept. 19, 1944 |
| 2,433,943 | Zwicky et al. | Jan. 6, 1948 |
| 2,452,472 | Keating | Oct. 26, 1948 |
| 2,523,096 | Clements | Sept. 19, 1950 |
| 2,537,526 | Hannum | Jan. 9, 1951 |
| 2,728,192 | Ross | Dec. 27, 1955 |
| 2,787,885 | Maynor | Apr. 9, 1957 |

FOREIGN PATENTS

| | | |
|---|---|---|
| 418,794 | France | Oct. 10, 1910 |
| 690,632 | Great Britain | Apr. 22, 1953 |